United States Patent [19]

Fiaschetti et al.

[11] Patent Number: 5,819,197
[45] Date of Patent: *Oct. 6, 1998

[54] METHOD OF MISFIRE DETECTION FOR AN INTERNAL COMBUSTION ENGINE

[75] Inventors: John Fiaschetti, Warren; Douglas M. Stander, Grosse Pt. Woods; Zhijian Wu, Rochester Hills, all of Mich.

[73] Assignee: Chrysler Corporation, Auburn Hills, Mich.

[ * ] Notice: The term of this patent shall not extend beyond the expiration date of Pat. No. 5,574,217.

[21] Appl. No.: 922,273

[22] Filed: Sep. 3, 1997

Related U.S. Application Data

[63] Continuation of Ser. No. 721,000, Oct. 15, 1996.

[51] Int. Cl.$^6$ .................................................. G01M 15/00
[52] U.S. Cl. .......................... 701/110; 73/116; 73/117.3; 123/419; 123/436; 701/101
[58] Field of Search ................... 73/116, 117.2; 701/101, 110, 111; 123/419, 425, 436

[56] References Cited

U.S. PATENT DOCUMENTS

| | | | |
|---|---|---|---|
| 5,041,980 | 8/1991 | Maddock et al. | 364/431.07 |
| 5,095,742 | 3/1992 | James et al. | 73/116 |
| 5,105,372 | 4/1992 | Provost et al. | 73/116 |
| 5,222,392 | 6/1993 | Baba et al. | 73/116 |
| 5,237,862 | 8/1993 | Mangrulkar et al. | 73/116 |
| 5,331,848 | 7/1994 | Nakagawa et al. | 73/116 |
| 5,361,629 | 11/1994 | McCombie | 73/117.3 |
| 5,508,927 | 4/1996 | Remboski, Jr. et al. | 73/112 |
| 5,574,217 | 11/1996 | McCombie | 73/116 |

OTHER PUBLICATIONS

U.S.S.N. 08/468,117, filed Jun. 6, 1995, "Engine Misfire Detection with Compensation for Normal Acceleration of Crankshaft".
U.S.S.N. 08/468,117, filed Jun. 6, 1996, "Engine Misfire Detection with Rough Road Inhibit".
U.S.S.N. 08/468,113, filed Jun. 6, 1995, "Engine Misfire Detection with Cascade Filter Configuration".
U.S.S.N. 08/511,125, filed Aug. 4, 1995, "Engine Misfire Detection with Digital Filtering".

*Primary Examiner*—George M. Dombroske
*Attorney, Agent, or Firm*—Mark P. Calcaterra

[57] ABSTRACT

A method of misfire detection for an internal combustion engine in a motor vehicle includes the step of sampling a misfire indicator and filtering the misfire indicator to provide a filtered misfire indicator. The method also includes the step of selecting one misfire indicator point from the filtered misfire indicator. The method further includes the steps of comparing the one misfire indicator point to a misfire threshold to detect a misfire event and identifying a misfire if a misfire event is detected.

17 Claims, 2 Drawing Sheets

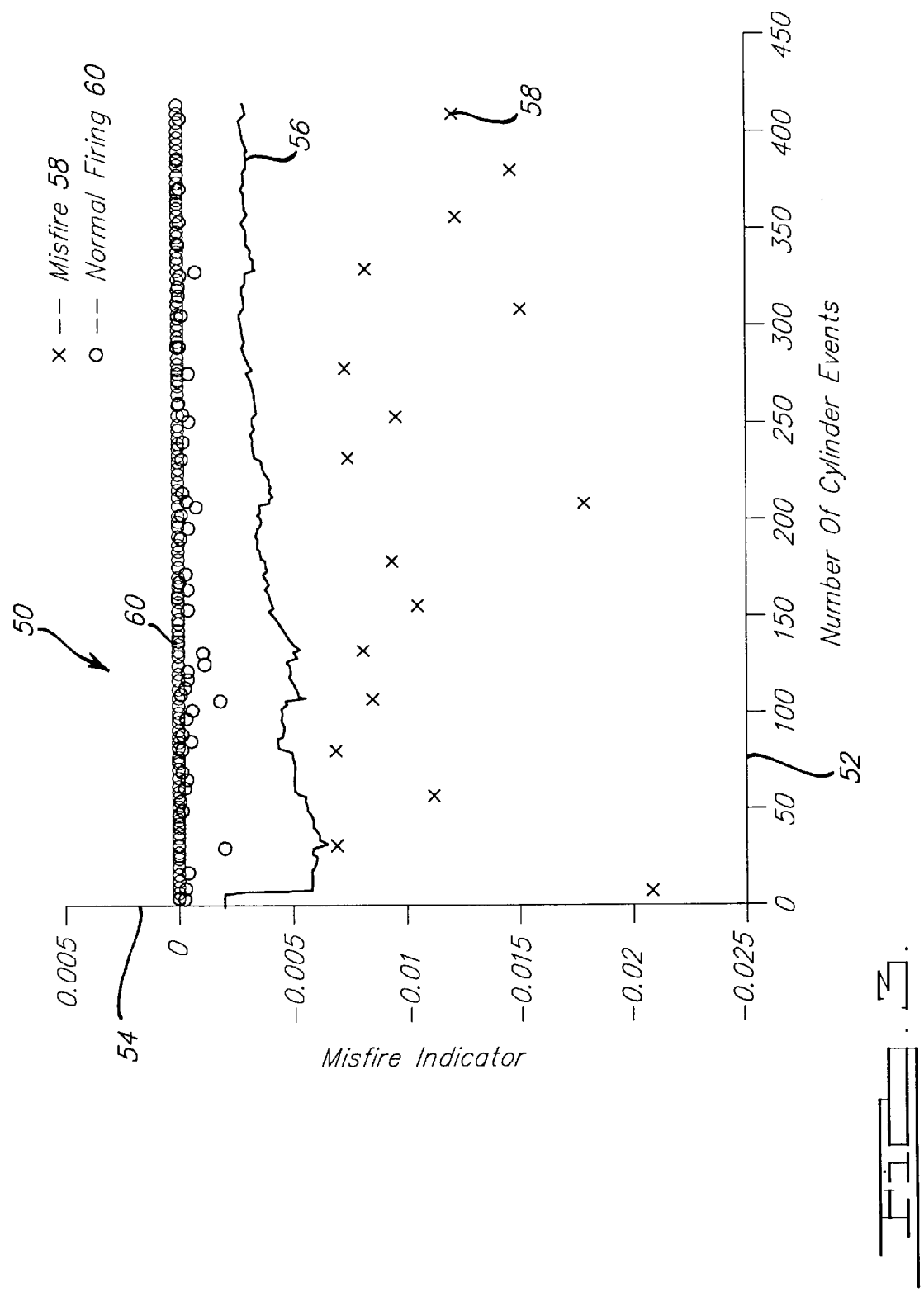

METHOD OF MISFIRE DETECTION FOR AN INTERNAL COMBUSTION ENGINE

CROSS-REFERENCE TO RELATED APPLICATION

This application is a continuation of pending application Ser. No. 08/721,000, titled "Method of Misfire Detection for an Internal Combustion Engine" filed Oct. 15, 1996, by the same inventors as in the present application.

BACKGROUND OF THE INVENTION

1. Field of the Invention

The present invention relates generally to internal combustion engines in vehicles, and, more particularly, to a method of misfire detection for an internal combustion engine in a motor vehicle.

2. Description of the Related Art

Since California adopted the first emission standard in 1960, motor vehicles sold in the United States have been required to comply with increasingly more stringent Federal and California emission standards. California recently implemented requirements that new vehicles include expanded on-board diagnostic systems. The purpose of the on-board diagnostic system is to alert a vehicle operator that there is a potential technical problem with an emission-related component in the vehicle and to assist a repair technician in resolving the problem. In particular, California requires that new vehicles sold in California include an on-board diagnostic system capable of monitoring engine misfire.

Accurately identifying the occurrence of an engine misfire that requires servicing of the vehicle by the repair technician is difficult. Many incidents of engine misfire tend to be brief, temporary and self-correcting. The variable operating conditions that the engine is subjected to also affect the reliability of engine misfire detection.

Existing and future emission regulations may require that the on-board diagnostic system collect detailed information regarding the misfire occurrence, such as identifying the cylinder responsible for the misfire. The misfire information may then be downloaded from the vehicle to a service center computer to analyze the cause of the misfire condition in the vehicle.

Presently, engine misfire detection is accomplished by measuring crankshaft speed once per an engine cylinder event, and evaluating the crankshaft speed to determine if a misfire has occurred. An example of a misfire detection and identification approach is disclosed in U.S. Pat. No. 5,361,629 to McCombie and titled "Single Sensor Misfire Detection Apparatus and Method for an Internal Combustion Engine". This patented misfire detection method senses rotation of a crankshaft and calculates a crankshaft velocity based on the sensed rotation. The calculated crankshaft velocity or a compensated velocity change is compared to a predetermined crankshaft velocity range to determine if misfire occurred.

More recent misfire detection approaches are disclosed in pending U.S. patent application Ser. No. 08/468,117, filed Jun. 6, 1995, now U.S. Pat. No. 5,574,217 entitled "Engine Misfire Detection with Compensation for Normal Acceleration of Crankshaft"; U.S. patent application Ser. No. 08/469,040, filed Jun. 6, 1996, now U.S. Pat. No. 5,544,521 entitled "Engine Misfire Detection with Rough Road Inhibit"; U.S. patent application Ser. No. 08/468,113, filed Jun. 6, 1995, now U.S. Pat. No. 5,602,339 entitled "Engine Misfire Detection with Cascade Filter Configuration"; and U.S. patent application Ser. No. 08/511,125, filed Aug. 4, 1995, entitled "Engine Misfire Detection with Digital Filtering". The aforementioned applications are commonly assigned to the assignee of the present application. The above referenced approaches generally teach misfire detection which includes sorting a plurality of changes in angular velocity over a predetermined series of cylinder firings and averaging the two middle-most angular velocity changes to provide an average change in velocity value. A deviation is determined between the change in angular velocity for a selected cylinder and the average change in velocity value. Misfires are detected as a function of a comparison of the deviation with a threshold value.

However, a low data sample rate can influence the accuracy of these approaches in distinguishing between a true misfire condition and a false misfire condition. For example, the above method could falsely identify a harmless noise such as crankshaft torsional vibration, road noise, or high engine speed induced torsional vibration as a misfire. Excessive noise makes it difficult to distinguish between an actual and false misfire condition. Therefore, there is a need in the art for a method of misfire detection that is more accurate and reliable.

SUMMARY OF THE INVENTION

It is, therefore, one object of the present invention to provide a method of misfire detection for an internal combustion engine in a motor vehicle.

It is another object of the present invention to provide a method of misfire detection that is more accurate and reliable for an internal combustion engine in a motor vehicle.

It is yet another object of the present invention to provide a method of misfire detection that uses high data rate sampling to better distinguish between an actual misfire condition and a false misfire condition.

It is still another object of the present invention to provide a method of misfire detection that includes a dynamic threshold for decision making.

To achieve the foregoing objects, the present invention is a method of misfire detection for an internal combustion engine in a motor vehicle. The method includes the steps of sampling a misfire indicator and filtering the misfire indicator to provide a filtered misfire indicator. The method also includes the step of selecting one misfire indicator point from the filtered misfire indicator. The method further includes the steps of comparing the one misfire indicator point to a misfire threshold to detect a misfire event and identifying a misfire event if the misfire event is detected.

One advantage of the present invention is that a new and improved method for misfire detection is provided for an internal combustion engine in a motor vehicle. Another advantage of the present invention is that a more accurate and reliable method of misfire detection is provided that distinguishes between an actual and false misfire event. Yet another advantage of the present invention is that a high rate of data sampling allows the method to filter out undesirable noise signals. Still another advantage of the present invention is that the method allows a dynamic threshold for decision making which enhances the misfire detection performance and also reduces the effect of engine to engine variability.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 3 is a graph of misfire indicator versus number of cylinder events for the method of misfire detection of FIG. 2.

DESCRIPTION OF THE PREFERRED EMBODIMENT(S)

Figure 1:
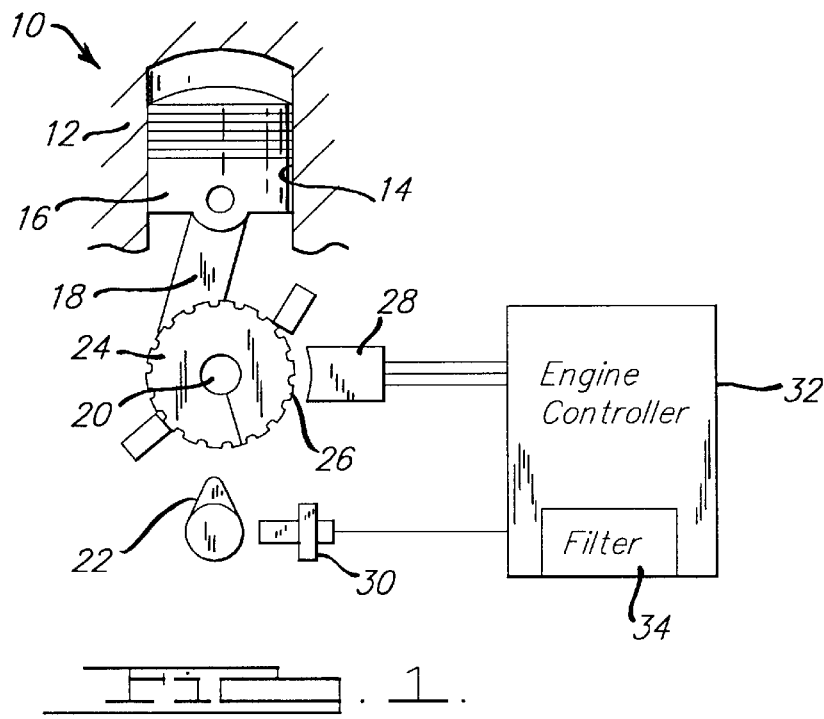
FIG. 1 is a schematic diagram of an engine control system and internal combustion engine in a motor vehicle used in conjunction with a method, according to the present invention.

Referring to FIG. 1, an engine control system 10 is illustrated schematically for an internal combustion engine 12 in a motor vehicle (not shown). The engine 12 is partially shown in a cut-away view, illustrating one of a multiple of cylinders 14 in the engine 12. The engine 12 includes a piston 16 disposed within each cylinder 14. The piston 16 is operatively connected by a connecting rod 18 to a crankshaft 20. A camshaft 22 is used to open and close at least one valve (not shown) of the cylinder 14 for various strokes of the piston 16. In a four stroke spark-ignited (SI) internal combustion engine, these strokes include intake, compression, expansion and exhaust.

The engine control system 10 includes a crankshaft sensor target 24 having, at least one, preferably a plurality of trip points 26 operatively connected to the crankshaft 20. The engine control system 10 also includes a crankshaft position sensing mechanism or sensor 28 in communication with the crankshaft sensor target 24 and a camshaft position sensing mechanism or sensor 30 in communication with the camshaft 22. The engine control system 10 further includes an electronic controller or an engine controller 32 electrically connected to the sensors 28 and 30. The engine controller 32 includes a microprocessor, memory, signal conditioning circuitry, and other various components (not shown but well known in the art) for use with the misfire detection methodology. The engine controller 32 is configured to include or provide a filter 34 to be described herein. The outputs of sensors 28 and 30 communicate with the engine controller 32 using appropriate signal conditioning circuitry. It should be appreciated that the engine controller 32 utilizes the outputs of sensors 28 and 30 to determine the radial position of the piston 16 within the cylinder 14, generally measured in degrees. It should further be appreciated that the output from the crankshaft position sensor 28 may be used to determine a speed of the engine 12, typically measured in revolutions per minute, or RPM.

A spark plug (not shown) is operably connected to an individual cylinder 14, and the firing of the spark plug initiates the burn charge in the cylinder 14. It should be appreciated that the engine controller 32 signals the spark plug to fire at a predetermined spark advance. The spark advance is quantified as the number of crank angle degrees before top-dead-center on the compression stroke. The combination of spark advance, fuel and air determine the burn rate for the charge in the cylinder. Therefore, adjusting the spark advance modifies the burn rate. A misfire condition occurs if the burn charge varies from a predetermined burn rate. Engine misfire may degrade engine performance and vehicle operation. Under certain conditions, such as excessively lean operation, it could result in excessive engine out emissions of oxides of nitrogen and carbon monoxide that could potentially damage the vehicle catalytic converter (not shown).

Preferably, the engine 12 also includes various other sensing mechanisms to carry out its functions, such as a throttle position sensor, or a Manifold Absolute Pressure (MAP) sensor (not shown), which are conventional and well known in the art. The outputs of these sensors also communicate with the engine controller 32. It should be appreciated that the engine control system 10 also includes other hardware (not shown, but conventional in the art) to carry out the method to be described.

Figure 2:
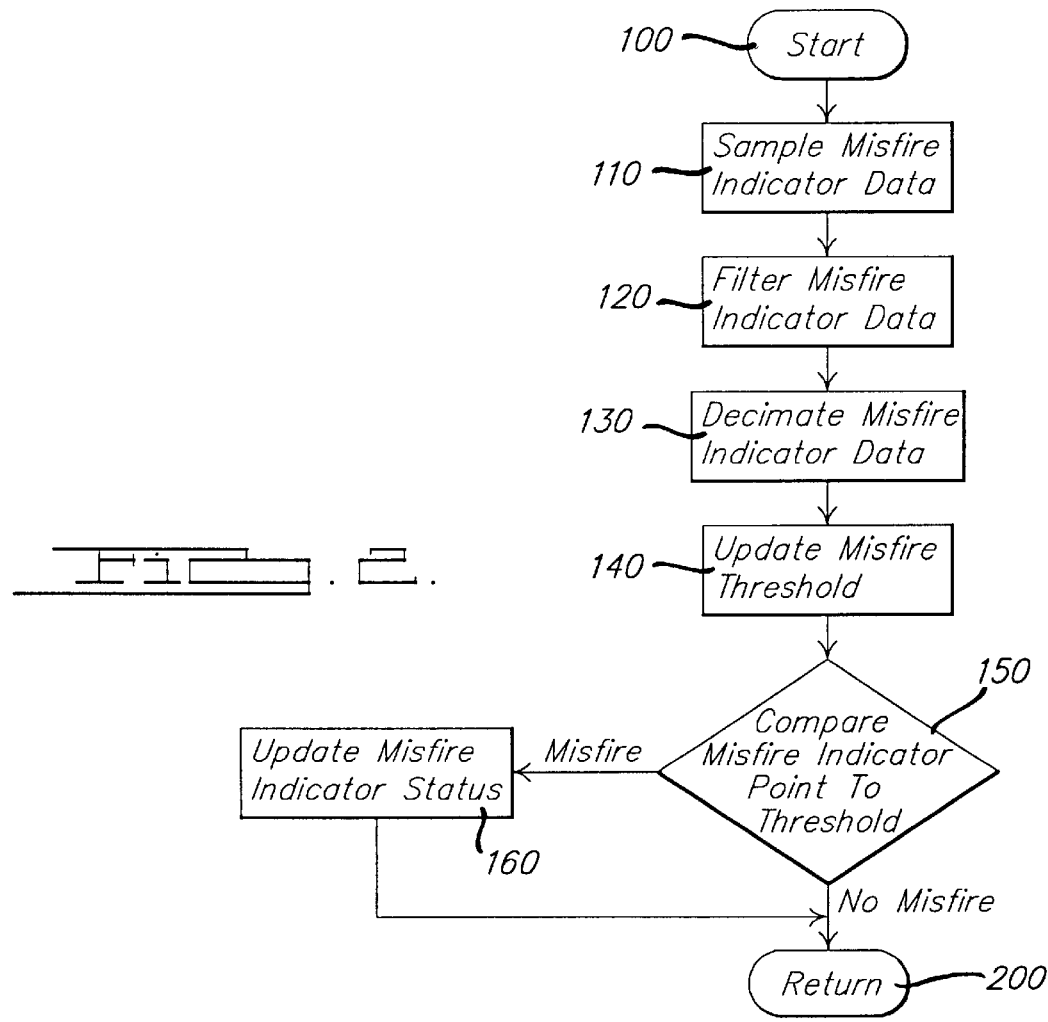
FIG. 2 is a flowchart illustrating a method of misfire detection, according to the present invention, for the internal combustion engine of FIG. 1.

Referring to FIG. 2, a method of misfire detection, according to the present invention, for the internal combustion engine 12 is illustrated. In this example, the engine 12 is a four cylinder internal combustion engine. It should be appreciated that the identification of a misfire event may be used as part of an on-board diagnostic or engine control system 10, as in this example, or as part of an overall engine control strategy.

The methodology begins in bubble 100 when it is called for from a main engine control program stored in the engine controller 32. The methodology advances to block 110 and samples a misfire indicator at a high data rate. Preferably, the rate of misfire indicator data sampling is optimized to enhance the misfire detection accuracy of the method. For example, an in-line four cylinder engine has a one hundred eighty degree (180°) expansion stroke for each cylinder 14. A data sample rate of eighteen (18) data points per cylinder 14 firing event, corresponds to one (1) sample every ten (10) degrees of crankshaft 20 rotation.

Preferably, the misfire indicator is an engine 12 operating characteristic sensitive to engine misfire, such as engine speed. Engine speed, expressed in revolutions per minute, or RPM, relates to crankshaft 20 velocity. For example, crankshaft 20 velocity is measured by taking the time displacement over an angular displacement for a predetermined interval during rotation of the crankshaft 20.

After block 110, the methodology advances to block 120 and filters the misfire indicator data to remove any unnecessary or extraneous effects. In the preferred embodiment, nonlinear signal processing, as is well known in the art, takes place in the engine controller 32 and is used to filter the raw misfire indicator data. Nonlinear signal processing consists of filters and/or functions which enhance the signal to noise ratio of the raw misfire indicator data by removing any undesirable signal attributes such as natural combustion variation, torsional vibration and drivetrain backlash.

Preferably, linear and nonlinear signal processing includes a single filter or single function or a combination of filter and function. An example includes an exponentially-weighted moving average and detrender which removes the signal's average components from the misfire indicator data sample. Another example is equalization, which makes a quality of a signal, such as amplitude or phase, equivalent to compensate for variations in operating conditions. A further example is a comb filter, which removes periodic frequencies such as firing frequency noise from the misfire indicator data sample to eliminate normal combustion frequencies. Still a further example is a band pass filter which removes other unwanted frequency characteristics from the misfire indicator data sample, such as extraneous road noise, torsional vibration of the crankshaft 20 and vibration due to the interaction of the engine 12 and transmission (not shown but well known in the art).

After block 120, the methodology advances to block 130 and decimates the misfire indicator data using a predetermined criteria to select one misfire indicator point per cylinder firing event. An example of a predetermined criteria includes selecting a predetermined Nth misfire indicator data point. Another example includes selecting a middle misfire indicator data point. Preferably, the one misfire indicator point is processed to further enhance the distinction between a misfire and non-misfire event. For example, zero-mean processing of a non-misfire indicator data point helps to enhance the misfire signature and enhance the detectability of certain misfire patterns, such as a double cylinder misfire.

Another technique includes increasing the separation between the signature for a misfire indicator point and a non-misfire indicator point such as by cubing the point.

After block 130, the methodology advances to block 140 and updates a misfire threshold value. Preferably, the misfire threshold value is a dynamic threshold calculated as a function of the previous misfire and non-misfire indicator points obtained during the current engine key-on. For example, a statistical technique such as a moving average maintains a running mean and deviation of the population of misfire indicator points and non-misfire indicator points.

After block 140, the methodology advances to diamond 150 and compares the one misfire indicator point to the misfire threshold value to determine if a misfire has occurred. If a misfire has occurred, the methodology advances to block 160 and a misfire event is identified, such as by updating a misfire indicator status maintained in the engine controller 32. Preferably, the methodology advances to bubble 200 and returns to the main engine control program. If a misfire has not occurred, the methodology advances to bubble 200, previously described.

Referring to FIG. 3, a graph 50 of misfire indicator versus number of cylinder events for the application of the method for misfire detection in the internal combustion engine 12 is illustrated. The method was incorporated on a motor vehicle and a misfire condition was purposefully induced to demonstrate the capability of the method in identifying a misfire event.

The x-axis 52 corresponds to a number of engine cylinder events. The y-axis 54 represents a numeric misfire indicator. A misfire threshold 56, dynamically calculated in this embodiment, separates a misfire event from a non-misfire event for a firing cylinder 14. The misfire indicator point is compared to the misfire threshold, and if the misfire indicator point falls below the misfire threshold in this example, a misfire is indicated by an "X" 58. If the misfire indicator point is above the misfire threshold in this example, a normal firing event is indicated by an "O" 60. In this example, the probability of detection is 100% and the probability of a false alarm is 0%. As this example illustrates, the method successfully and accurately detected a misfire condition.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of misfire detection for an internal combustion engine in a motor vehicle, said method comprising the steps of:

sampling a misfire indicator at a high rate;

filtering the misfire indicator to provide a misfire indicator;

decimating the filtered misfire indicator using a predetermined criteria to select one misfire indicator point per cylinder firing event;

selecting one misfire indicator point from the decimated misfire indicator;

processing the one misfire indicator point to enhance a distinction between a misfire and non-misfire event;

updating a dynamic misfire threshold as a function of previous misfire indicator points and non-misfire indicator points;

comparing the one misfire indicator point to the dynamic misfire threshold to detect a misfire event;

ending said method if the misfire event is not detected; and identifying a misfire if a misfire event is detected.

2. A method as set forth in claim 1 wherein said step of sampling a misfire indicator at a high rate comprises sampling the misfire indicator every 20 degrees of crankshaft rotation for an individual engine cylinder.

3. A method as set forth in claim 1 wherein said step of sampling a misfire indicator comprises optimizing a rate of sampling the misfire indicator.

4. A method as set forth in claim 1 wherein the misfire indicator is engine speed.

5. A method as set forth in claim 1 wherein said step of filtering the misfire indicator comprises applying nonlinear signal processing to the misfire indicator.

6. A method as set forth in claim 1 wherein said step of selecting one misfire indicator point includes selecting a predetermined one misfire indicator point per a cylinder firing event from the filtered misfire indicator.

7. A method as set forth in claim 1 wherein said step of selecting one misfire indicator point includes selecting the one misfire indicator point per a cylinder firing event from a middle of the filtered misfire indicator.

8. A method as set forth in claim 1 wherein the misfire threshold comprises calculating a dynamic misfire threshold as a function of a population of a misfire indicator point and a non-misfire indicator point previously identified during a current engine key-on.

9. A method as set forth in claim 8 wherein said step of calculating includes taking a moving average of the population of misfire indicator point and the population of non-misfire indicator point.

10. A method of misfire detection for an internal combustion engine in a motor vehicle, said method comprising the steps of:

sampling a misfire indicator at a high rate;

filtering the misfire indicator to obtain a filtered misfire indicator;

decimating the filtered misfire indicator using a predetermined criteria to select one misfire indicator point per cylinder firing event;

selecting one misfire indicator point from the decimated misfire indicator;

processing the one misfire indicator point to enhance a distinction between a misfire and non-misfire event;

updating a dynamic misfire threshold as a function of a population of a misfire indicator point and a population of a non-misfire indicator point previously identified during a current engine key-on;

detecting a misfire event by comparing the one misfire indicator point to the dynamic misfire threshold;

ending said method if the misfire event is not detected; and updating a misfire status if the misfire event is detected.

11. A method as set forth in claim 10 wherein said step of sampling a misfire indicator at a high rate comprises sampling the misfire indicator every 20 degrees of crankshaft rotation for an individual engine cylinder.

12. A method as set forth in claim 10 wherein said step of sampling a misfire indicator comprises optimizing a rate of sampling the misfire indicator.

13. A method as set forth in claim 10 wherein the misfire indicator is engine speed.

14. A method as set forth in claim 10 wherein said step of filtering the misfire indicator comprises applying nonlinear signal processing to the misfire indicator.

15. A method as set forth in claim 10 wherein said step of selecting one misfire indicator point per a cylinder firing event includes predetermining which one misfire indicator point to select from the filtered misfire indicator.

16. A method as set forth in claim 10 wherein said step of selecting one misfire indicator point per a cylinder firing event includes selecting the one misfire indicator point from a middle of the filtered misfire indicator.

17. A method as set forth in claim 10 wherein said step of calculating includes calculating a moving average of the population of misfire indicator point and a moving average of the population of non-misfire indicator point.

* * * * *